US009032480B2

(12) United States Patent
Mindler et al.

(10) Patent No.: US 9,032,480 B2
(45) Date of Patent: May 12, 2015

(54) PROVIDING MULTIPLE APN CONNECTIONS SUPPORT IN A BROWSER

(71) Applicant: Cellco Partnership, Basking Ridge, NJ (US)

(72) Inventors: Daniel Mindler, Somerset, NJ (US); Lixia Yan, Bedminster, NJ (US); Barry Hoffner, Bridgewater, NJ (US); Ho Yin Cheuk, Bridgewater, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 195 days.

(21) Appl. No.: 13/729,429

(22) Filed: Dec. 28, 2012

(65) Prior Publication Data
US 2014/0189790 A1 Jul. 3, 2014

(51) Int. Cl.
*H04L 29/06* (2006.01)
*G06F 17/30* (2006.01)
*H04W 48/00* (2009.01)
*H04L 29/08* (2006.01)
*H04L 29/12* (2006.01)
*H04W 4/00* (2009.01)

(52) U.S. Cl.
CPC ........ *H04L 65/1069* (2013.01); *H04L 65/1016* (2013.01); *H04L 65/1073* (2013.01); *H04L 65/80* (2013.01); *G06F 17/30* (2013.01); *H04W 4/00* (2013.01); *H04W 48/00* (2013.01); *H04L 67/02* (2013.01); *H04L 61/00* (2013.01)

(58) Field of Classification Search
CPC .............. H04L 29/1265; H04L 29/12735; H04L 61/303; H04L 61/3075; H04L 63/08; H04L 65/1069
USPC ........................................................... 726/3
See application file for complete search history.

(56) References Cited

U.S. PATENT DOCUMENTS

| 2003/0081607 A1* | 5/2003 | Kavanagh | 370/392 |
| 2004/0125762 A1* | 7/2004 | Haller et al. | 370/313 |
| 2005/0153683 A1* | 7/2005 | Gustafsson | 455/411 |
| 2014/0003357 A1* | 1/2014 | Ejzak et al. | 370/329 |

OTHER PUBLICATIONS

P. Calhoun et al., "Diameter Base Protocol," Network Working Group, Request for Comments: 3588, Sep. 2003; 146 pages.

* cited by examiner

*Primary Examiner* — Dant Shaifer Harriman
*Assistant Examiner* — Abiy Getachew

(57) ABSTRACT

At a web browser application installed on a device a first Uniform Resource Locator (URL) is received. The web browser application determines a first Access Point Name (APN) network identifier associated with the first URL and establishes a first data connection based on the first APN network identifier between the device and a network. At the web browser application installed on the device a second URL is received. The web browser application determines a second Access Point Name (APN) network identifier associated with the second URL and establishes a second data connection based on the second APN network identifier between the device and a network.

24 Claims, 10 Drawing Sheets

PROVIDING MULTIPLE APN CONNECTIONS SUPPORT IN A BROWSER

BACKGROUND

In a 4G LTE network, Access Point Name (APN) network identifier defines the Packet Data Network (PDN) to which user equipment (UE) requests connectivity. The following PDN may be currently supported by a communication network provider: IP Multimedia System (IMS) PDN, admin PDN, Internet PDN, content filtering PDN, enterprise PDN, app PDN, and 800 PDN. Each PDN may provide a different type of service to the UE. For example, the IMS PDN provides IMS service; the admin PDN provides device management and administrative services; and the 800 PDN provides 800 data services.

There may be two ways for the UE to access services provided by the network: (1) an application client pre-loaded or downloaded from the market place and/or (2) a web browser. By default, an application client may attempt to set up a data connection with vzwinternet APN, and traffic generated from the application client goes through internet PDN. The application client may also have the capability to invoke an API to specify a different APN (e.g., vzw800 APN or vzwapp APN) for setting up the data connection. Depending on the specific APN used for establishing the data connection, the traffic generated from the application client goes to the appropriate server through the data connection associated the specific APN.

Unlike the application client, the web browser may not be able to set up data connections with multiple APNs. The web browser is a software application for retrieving, presenting, and traversing information resources on the World Wide Web, web servers in private networks or files in file systems. The web browser is associated with a collection of URL protocol handlers and display routines. The web browser may not be able to tie a data connection with a specific APN such as, for example, the vzw800 APN and the vzwapp APN. The traffic generated by the web browser, therefore, is routed through the same default APN associated with the vzwinternet PDN. For example, a web browser request to connect to X1Y2.com may be carried through the default internet APN to connect to the X1Y2 server. In response, the X1Y2 server provides information that permits the X1Y2.com web page to be displayed through the web browser. It may be the customer's responsibility to pay for the data traffic experienced while using X1Y2.com except, for example, for the data traffic X1Y2.com offers for free to the customer. However, since all the data traffic is routed through the same default APN, the browser may not be able to differentiate between different types of traffic. As such, the customer may be charged for traffic regardless of the type of traffic experienced while using X1Y2.com.

Hence, a need exists for an effective and reliable way to allow a web browser to differentiate between two different types of traffic and route them accordingly. Specifically, a need exists for an effective and reliable way to support multiple APN connections on the web browser.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
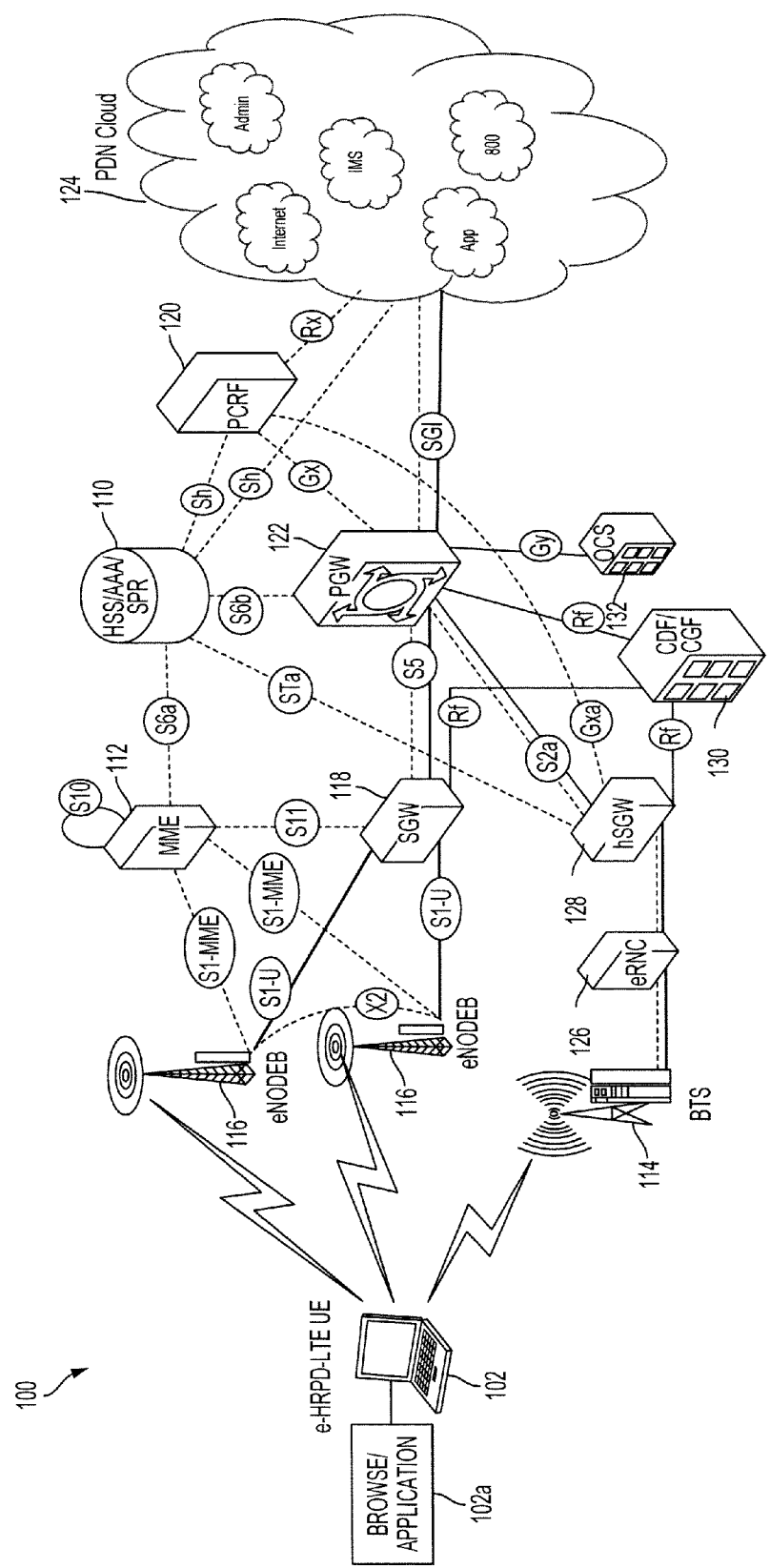
FIG. 1 is a functional block diagram describing a network, which allows a user equipment (UE) to establish a multiple APN data connections using a web browser.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to techniques and equipment for allowing a web browser to provide multiple APN connections support to the communication network. Each APN connection may correspond to a different communication tunnel between the device hosting the web browser and a specific PDN. As noted above, today, a web browser may only be able to provide a single APN connection support. Specifically, the web browser may only be able to support a data connection with the default APN (e.g., vzwinternet APN). All traffic generated from the web browser therefore may go through the default APN to the internet PDN. The techniques described in this application allow the web browser to set up data connections with different APNs. After a data connection with a specific APN is created, data traffic generated from the web browser may be carried through the specific APN.

In one implementation, the instant application describes using new Uniform Resource Indicator (URI) schemes to support multiple APN connections on the web browser. The URI is a string of characters, which can identify a name or a resource on a network using specific protocols. The URI can be classified into two types: a Uniform Resource Name (URN) and a Uniform Resource Locator (URL). The URN defines the resource's name on the network; whereas, the URL defines the resource's address on the network. The new URI schemes may be registered with the Internet Assigned Numbers Authority (IANA). Each new URI scheme may be programmed to be handled by the web browser. The web browser may read and parse the new URI scheme, and map the new URI scheme to a specific APN for establishing a data connection to the network. For example, the new URI scheme http-800 may be used for setting up a data connection with the vzw800 APN. Therefore, when http-800://www.X2Y3.com is entered into an address bar in the web browser, the web browser identifies the URI scheme http-800 associated with the entered URL and forwards the URL to the http-800 module for processing. The http-800 module calls the existing HTTP, TCP/IP protocols and sets up a data connection with the vzw800 APN. The data traffic usage associated with the URL http-800://www.X2Y3.com goes through the vzw800 APN to reach the X2Y3 server. This implementation is described in more detail below with respect to FIGS. 2A-2B.

In another implementation, the instant application describes using new port numbers in the URI syntax to support multiple APN connections on the web browser. In this scenario, the web browser may take advantage of the port numbers that have not been officially registered by other applications. The web browser may read and parse the port number included in the URL. The web Browser may then map the port number to the specific APN for setting up a data connection. After the APN is determined and before setting up the data connection, the web browser may replace the port number with the official port number assigned for the URI scheme application. For example, the port number 65500 may specify vzw800APN for establishing the data connection. Therefore, when http://www.X2Y3.com:65500 is entered into the address bar in the web browser; the web browser determines the APN associated with the port number 65500. The web browser may then replace the port number 65500 with the official TCP port number 80, and continue processing with http://www.X2Y3.com:80 by calling the existing HTTP, TCP/IP protocols and setting up a data connection with the vzw800 APN. This implementation is described in more detail below with respect to FIGS. 3A-3B.

In another implementation, the instant application describes using new query parameters in the URI syntax to support multiple APN connections on the web browser. The new query parameter may include "apn" reserved for APN setup purposes. The web browser may read and parse this new query parameter included in the URL and use it to determine the appropriate APN for establishing the data connection to the network. For example, apn=vzw800 may indicate to the web browser to set up a data connection with the vzw800 APN; whereas, apn=vzwapp may indicate to the web browser to set up a data connection with the vzwapp APN. If the apn is not included in the URI, the web browser may set up a data connection with the default APN (e.g., the vzwinternet APN). After the APN is determined, the web browser may remove the query parameter configuration information from the URL. To illustrate, when http://www.X2Y3.com?apn=vzw800 is entered into the address bar in the web browser, the web browser recognizes that it should set up a data connection with the vzw800 APN. After the APN is determined, the web browser removes the apn parameter and continues processing with http://www.X2Y3.com. This implementation is described in more detail below with respect to FIGS. 5A-5B.

Reference now is made in detail to the examples illustrated in the accompanying drawings and discussed below. FIG. 1 is a functional block diagram describing a network 100 allowing user equipment (UE) to establish a multiple APN data connections using a web browser. The network 100 may have all of the features, hardware, and systems of other networks, however, in this example, only the relevant portions of the network are described. The network 100 can have a Home Subscriber Server (HSS) 110. The HSS 110 evolved from a Home Location Register (HLR). In 3GPP networks, and particularly in the LTE architecture (for 3G and 4G networks), the HSS 110 can be a database of user (subscriber) information, i.e., customer profiles. The user information may include account information, account status, user preferences, features subscribed to by the user, user's current location, and allowable APNs. In roaming scenarios, the HSS 110 in the network 100 provides the user profile to a Mobility Management Entity (MME) 112.

The MME 112 is a control-node for the LTE access-network, in that it can be a single point (or "node") within the network that integrates numerous core functions and control over network flow, load sharing, etc. It can be responsible for tracking, paging, and retransmission procedures to the UE 102. The MME 112 can also be involved in the UE's activation/deactivation of service flows (also known as bearers) and is also responsible for authenticating the UE 102 when it is roaming, by interacting with the HSS 110. The UE 102 through the base station 114 or one of the eNodeBs 116 and the Serving Gateway (SGW) 118, and MME 112, registers and authenticates with the network 100. The network 100 includes LTE servers such as, for example, Policy Control and Charging Rules Function (PCRF) 120, MME 112, PDN Gateway (PGW) 122, and the SGW 118. The network 100 also includes PDN servers located in the PDN cloud 124. The PDN cloud 124 may include one or more of the followings servers: IP Multimedia System (IMS) PDN, admin PDN, Internet PDN, content filtering PDN, enterprise PDN, app PDN, and 800 PDN. The authentication procedure between the UE 102 and the MME 112 can involve multiple messages per current 3GPP standards (Authentication Request/Response, Security Mode Command/Complete, etc).

The HSS 110 communicates with the MME 112 using an S6a protocol. The communication between HSS 110 and the MME 112 may traverse zero, one, or multiple diameter proxies. In the illustrated example, the communication occurs through no diameter proxies. The diameter proxy is a border gateway for the diameter protocol. The diameter protocol is a next generation Authentication, Authorization, and Accounting (AAA) protocol for IP communication networks. The protocol facilitates the exchange of AAA related information within the network. A more complete description of the diameter protocol can be found in a Request for Comments (RFC) 3588 (as published by the Internet Society, September 2003—which can be found at http://www.ietf.org/rfc/rfc3588.txt) which is incorporated herein by reference in its entirety. The S6a protocol enables transfer of profile and authentication data for authenticating/authorizing user access between the HSS 110 and the MME 112. The MME 112 can be responsible for a number of tasks, as noted above.

The PCRF 120 is configured to specify the QoS for the bearer based on a QoS Class Identifier (QCI) and ensures such specification is in accordance with the user's subscription profile stored on the HSS 110. The subscriber profile may include information about the subscriber. The information may include, for example, the MDN associated with the UE 102 and the various services subscribed to by the subscriber. The subscriber profile on the HSS 110 may also include information about which APNs the UE 102 is allowed to access. The APNs may include default APN, the vzw800 APN, the vzwapp APN, the vzwims APN, and/or the vzwadmin APN.

When the UE 102 sets up a data connection with each PDN, such as IMS PDN and/or Internet PDN, a data session may be created. Each data session may have one default bearer. Each bearer may be associated with one QCI. For example, when the UE 102 is connected to the Internet PDN and 800 PDN, two data sessions are setup. Each data session has one default bearer. Each default bearer is assigned with one QCI. Based on the subscriber profile, the PCRF 120 may determine the QCI that default bearer may use and then pass this information to the PGW 122 during the data session setup. The PGW 122 may then setup data session and default bearer with proper QCI. The PGW 122 is configured to assign IP addresses to the UE 102. The PGW 122 is also responsible for QoS enforcement based on the specified QoS by the PCRF 120. The SGW 118 is configured to receive the user's IP packets. The SGW 112 is also configured to serve as a mobility anchor for the bearers when the UE 102 moves from one eNodeB 116 to another. In the illustrated example, the MME 112 also communicates with the base station/antenna 114 to receive information and requests from the UE 102. The UE 102 may be configured to include a browser application 102a. The browser application 102a may include a new logic for identifying the specific APN for establishing the connection to the network. The specific APN may be identified based on the new URI scheme previously registered with the web browser 102a. The new URI scheme may also be registered with IANA and may include, for example, http-800, http-app, http-ims, and http-admin. Each new URI scheme may be programmed to be handled by the web browser 102a internally, instead of by an external specialized application. As part of the new logic, a new handler module may be created for each of the new URI schemes. When a URI scheme is entered into the address bar of the web browser 102a, the web browser 102a decodes the URI scheme and upon identifying that the URI scheme corresponds to one of the newly created URI schemes, the web browser 102a calls the corresponding URI scheme module to handle the new URI scheme. Within the new URI scheme module, the web browser 102a determines the APN to use for setting up the connection with the network 100. For example, URI scheme http-800 establishes vzw800 PDN connection; URI scheme http-app establishes vzwapp APN connection; URI scheme http-ims establishes vzwims APN connection; and URI scheme http-admin establishes vzwadmin APN connection. Each APN connection may be associated with a different IP address as assigned by the PGW 122.

To illustrate one specific example, when a customer uses the UE 102 to access X1Y2.com, the customer enters the URL www.X1Y2.com in the address bar of the web browser 102a. The web browser 102 parses the URL and identifies that the URL scheme corresponds to the http scheme. Therefore, the web browser 102 forwards the URL to the http handler. The http handler sends a data connection request to the PGW 122 with a default APN. The PGW 122 receives the request and checks with the HSS 110 to confirm the UE 102 is eligible for such a connection. The PGW 122 sends a request to the HSS 110 or the AAA to check if the UE 102 is eligible to access the default APN. The subscriber profile on the HSS 110 or the AAA includes information about which APNs the UE 102 is allowed to access. For example, if the 800 APN does not exist in the subscriber profile, the PGW 122 denies the session setup to the 800 APN. In keeping with the previous example, if the default APN exists in the subscriber profile, the PGW 122 allows the session setup to the default APN. If not, the PGW 122 rejects the request and informs the UE 102 of the same. If, however, the UE 102 is eligible for such a connection, the PGW 122 grants the request for establishing the default APN data connection and assigns the UE 102 an IP address. The PGW 122 also connects the UE 102 to the Internet PDN and provides the UE 102 with the web page associated with X1Y2.com. The data usage associated with visiting various links while using X1Y2.com may be charged to the customer.

X1Y2.com may provide 800 free data service to the customer by adding a new URL link onto its homepage (X1Y2.com). The new URL link may include hap-800:// www.X1Y2.com/customer_service. Upon selection of the link, the web browser 102a parses the URL link and identifies that the selected URL is associated with a new URI scheme http-800. The web browser 102a forwards the URL to a new http-800 module for processing the URL as will be described below in more detail below with respect to FIGS. 2A-2B. In response, the http-800 module sends a data connection request to the PGW 122 with APN corresponding to the vzw800 APN. The PGW 122 may check HSS 110 to determine if the UE 102 is eligible for this connection. If not, the PGW 122 rejects the request and informs the UE 102 of the same. If, however, the UE 102 is eligible for such a connection, the PGW 122 grants the request for establishing the vzw800 APN data connection and assigns the UE 102 another IP address. The PGW 122 also connects the UE 102 to the vzw800 PDN.

Each APN connection may be considered as a different pipe from the UE 102 to the PGW 122. For example, the Internet APN may be considered as a first pipe between the UE 102 and the PGW 122 and the vzw800 APN may be considered a second pipe between the UE 102 and the PGW 122. The 800 free data traffic associated with the 800 free data URL travels through the second pipe to the PGW 122 and the other traffic usage that occurs during the interaction with the X1Y2 web site may travel through the first pipe the PGW 122. The PGW 122 distinguishes the data coming through the first pipe from the data coming through the second pipe based on, for example, the IP addresses associated with each pipe and charges the operator of the UE 102 or X1Y2 Company for the data traffic usage accordingly.

The operator of the UE 102 may be charged based on a post-pay mechanism or a pre-paid mechanism. In the post-pay mechanism, the customer is allowed to use the data network 100 first and pay for such usage later, for example, on a monthly basis. To this end, the network elements (e.g., SGW 118, hSGW 128, PGW 122) gather information about the customer's monthly data usage and forward the record to CDF 130. In keeping with the previous example, when the customer visits X1Y2.com, the network elements generate records associated with this activity (e.g., 1 MB data usage associated with visiting X1Y2.com) and forward this record to the CDF 130. The records in the CDF 130 may be updated periodically, such as every half hour. The CDF 130 formats this data usage records and sends it to the IT system of the mobile communication network provider to generate a billing statement for the customer based on this data usage record. Once the billing statement is generated, it may be associated with the customer's account on the HSS 110.

In the pre-paid mechanism, the customer may be charged in real-time against a pre-paid deposit. For example, a pre-paid customer may have to deposit $100 on his/her account before being granted access to the data network 100. Once the customer's $100 on the account is exhausted, the customer's access to the network 100 is denied until the customer recharges its account. The pre-paid mechanism is supported by the OCS 132, which is a real-time charging system. In keeping with the previous example, when the customer launches a data session and requests access to X1Y2.com, the request is sent to the PGW 122. Before forwarding the customer's request to the X1Y2 server, the PGW 122 checks with the HSS 110 to determine how the customer should be charged for the data traffic. If the HSS 110 informs the PGW 122 that the customer is a post-pay customer, the PGW 122 allows access and bills the customer later. If the HSS 110 informs the PGW 122 that the customer is a pre-paid customer, the PGW 132 checks with the OCS 132 to determine if the customer has sufficient funds for this data usage. If yes, the PGW 122 forwards the customer's request to the X1Y2 server. If the OCS 132 informs the PGW 122 that the customer does not have sufficient funds, the PGW 122 stops the customer from accessing the X1Y2 server.

The PGW 122 is configured to monitor the data usage. When the customer launches a new data session, the PGW 122 sends a request to the OCS 132 to validate the customer. If the customer is valid and has money/credit or is not within TOD, the OCS 132 grants usage allowance. For example, the OCS 132 grants a specific Mega Bytes (MB) usage allowance and returns this granted usage allowance to the PGW 122. In response, the PGW 122 allows the customer to use the data network and start monitoring the data usage. Once the granted usage allowance is used up, the PGW 122 sends another request to the OCS 132 to ask for an additional usage allowance. If the customer is out-of-credit, the OCS 132 denies the additional usage allowance. The PGW 122 may maintain the data session, and stop the customer from access to the Internet by dropping the out-going data packets.

On the UE 102 side, the UE 102 may not know the customer is out-of-credit. Therefore, the applications on the UE 102 may still attempt to send data packets since data session is still up. Based on today OS logic, when there is no incoming acknowledgement being received for the out-going data packets, after a certain time period, the OS resets radio channel (e.g., terminate existing data session and re-establish a new one). The PGW 122 knows if the granted usage allowance or data quota assigned to this user by the OCS 132 is used up. Once granted usage allowance is used up, the PGW 122 reports the used usage allowance and sends a request to the OCS 132 to ask for a new granted usage allowance or data quota. The OCS 132 charges used usage allowance reported by the PGW 122 to the customer account, and then determines if the customer has enough money/credit to grant next data quota.

For example, assume the customer has 1 GB on his/her account, the PGW 122 requests for quota from the OCS 132. The OCS 132 returns with granted usage allowance of, for example, 100 MB. The PGW 122 may then allow the customer access to the Internet. The PGW 122 monitors if the 100 MB has been depleted. If yes, the PGW 122 reports used usage allowance of 100 MB to the OCS 132 and then sends a request for a new quota. The OCS 132 updates the customer account from 1 GB to 900 MB, and then assigns a new granted usage allowance of 100 MB to the PGW 122.

Moving forward, the UE 102 may be a 3G device with a 4G network capability or a 4G device. The 4G device can communicate with the PGW 122 through the eNodeB 116 and SGW 118. The 3G device with the 4G network capability can communicate with the PGW 122 through the BTS 114, the enhanced Radio Network Controller (eRNC) 126, and the hSGW 128. The BTS 114 receives the radio signals from the UE 102 and passes it to the eRNC 126 which will forward the signals to the hSGW 128. The functionality of the hSGW 128 is similar to that of SGW 118 except the hSGW 128 also acts as an interface between the 3G network and the 4G network.

The UE 102 is shown to be a laptop but can take other forms. For example, the UE 102 can take the form of portable handsets, smart-phones or personal digital assistants, although they may be implemented in other form factors. Program applications, including the web browser application 102a for supporting multiple APN connections can be configured to execute on many different types of mobile devices. For example, a mobile station application can be written to execute on a binary runtime environment for mobile (BREW-based) mobile station, a Windows Mobile based mobile station, Android, I-Phone, Java Mobile, or RIM based mobile station such as a BlackBerry or the like. Some of these types of devices can employ a multi-tasking operating system.

Figure 2A:
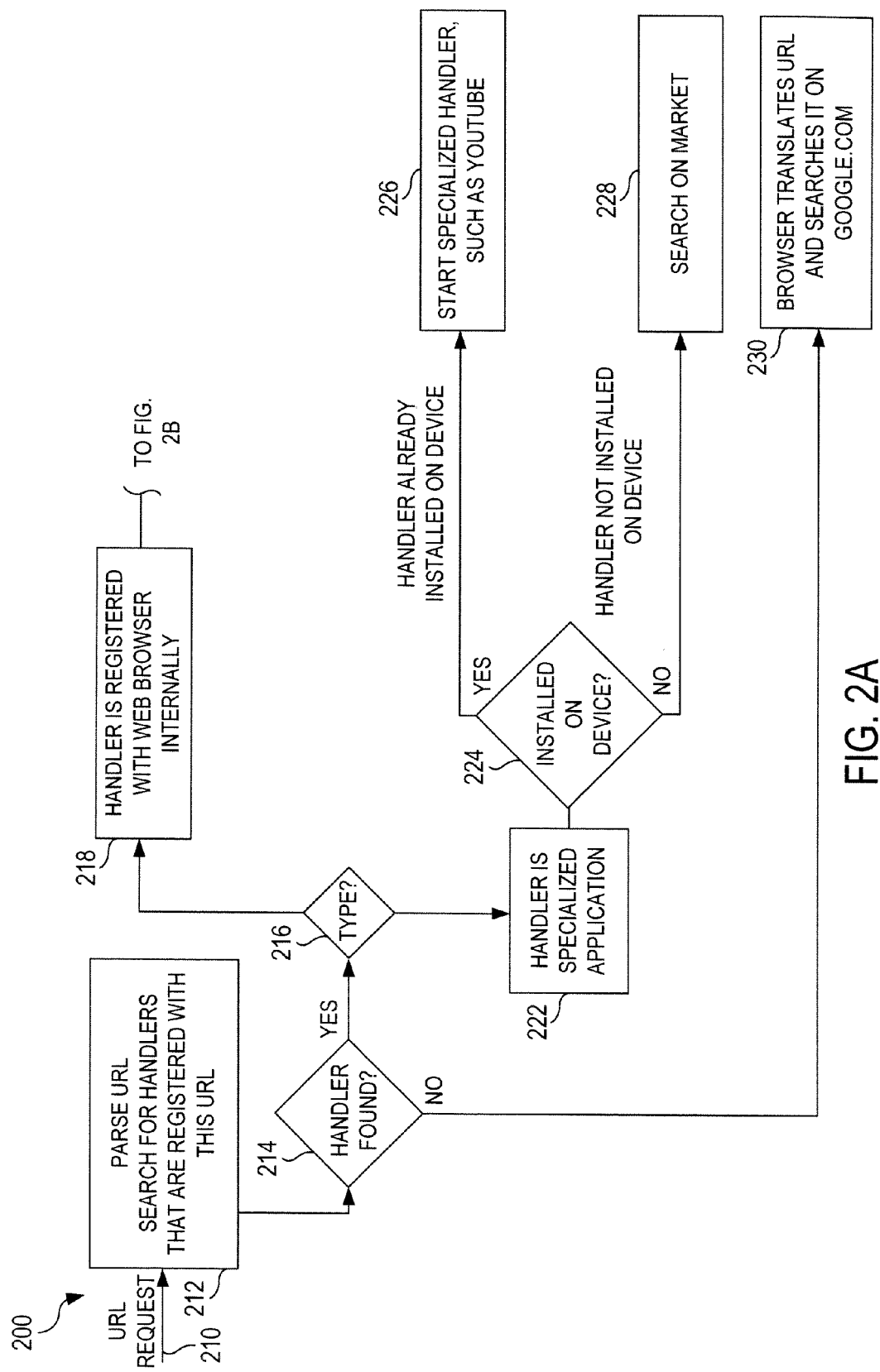
FIGS. 2A-2B illustrate an exemplary flow for providing multiple APN connections support in the web browser shown in FIG. 1 using new URI schemes.
Figure 2B:
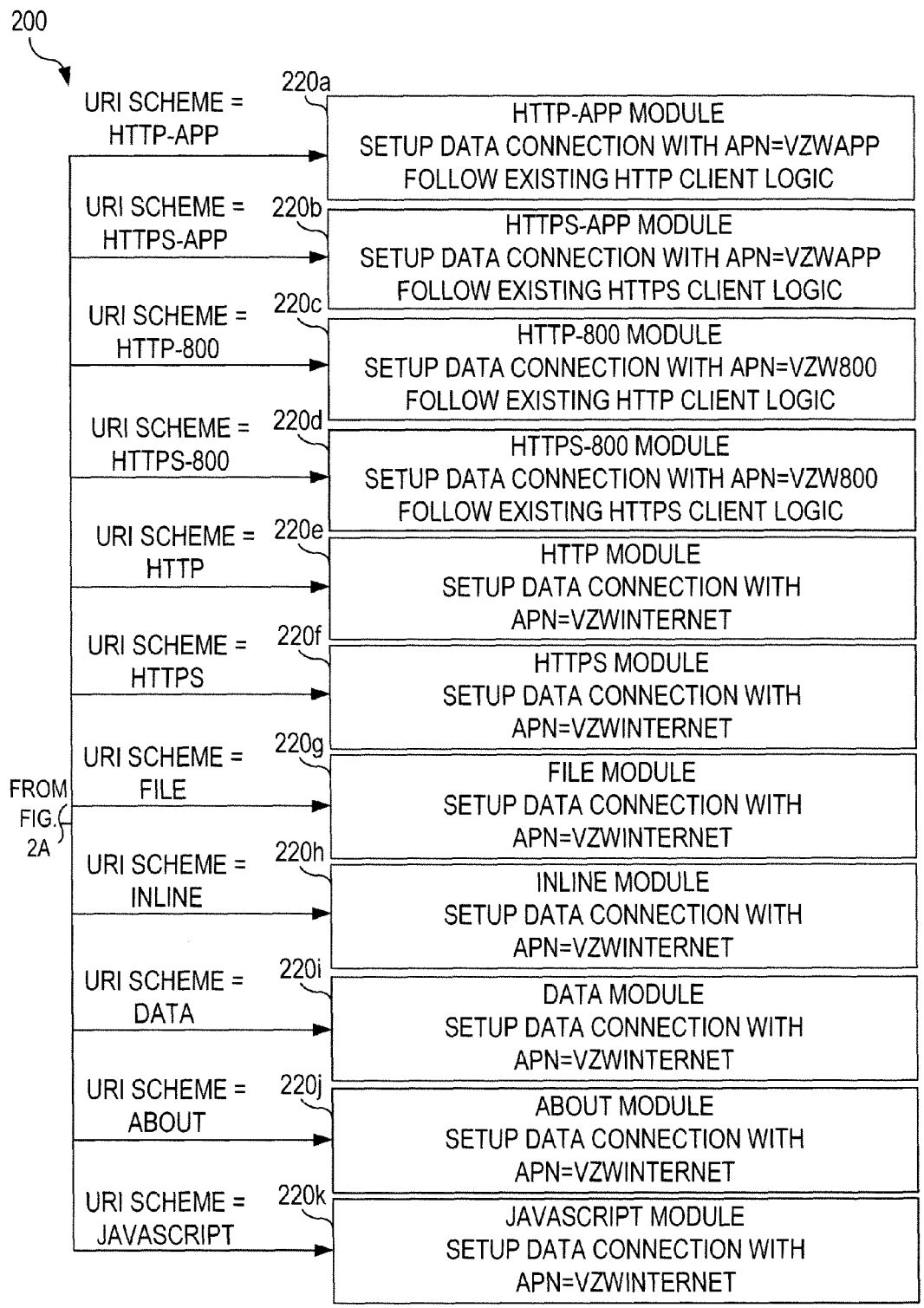

FIGS. 2A-2B illustrates an exemplary flow 200 for providing multiple APN connections support in the web browser 102a using new URI schemes. The flow 200 includes receiving a URL request (Step 210). The URL request may be entered by the user interacting with the web browser 102a. Alternatively, the URL request may be received as a result of the user selecting a specific link on a particular web site. In either case, the web browser 102a parses the URL to search for handlers that are registered with the received URL (Step 212). If a handler is found (Step 214, Yes), the web browser 102a determines the type of handler (Step 216). If the handler is registered with the web browser 102a internally (Step 218), the web browser 102a determines the type of URI scheme invoked by the URL and depending on the type of URI scheme invoked by the URL, the web browser 102a forwards the URL for processing to one of the handler modules 220a-220k as shown in FIG. 2B. For example, when the web browser 102a parses the URL scheme and identifies that the URL scheme corresponds to the http-app scheme, the web browser 102a calls the corresponding http-app module 220a. In response, the http-app module 220a sets up the data connection with the vzwapp APN using the existing http client logic. Establishing the data connection with the vzwapp APN will be described in more details with respect to FIG. 5.

For another example, when the web browser 102a decodes the URL scheme and identifies that the URL scheme corresponds to the https-app scheme, the web browser 102a calls the corresponding https-app module 220b. In response, the https-app module 220b sets up the data connection with the vzwapp APN following the existing https client logic. For another example, when the web browser 102a decodes the URL scheme and identifies that the URL scheme corresponds to the http-800, the web browser 102a calls the corresponding http-800 module 220c. In response, the http-800 module 220c sets up the data connection with the vzw800 APN following the existing http client logic. For yet another example, when the web browser 102a decodes the URI scheme and identifies that the URI scheme corresponds to the https-800 scheme, the web browser 102a calls the corresponding https-800 module 220d. In response, the https-800 module 220d sets up the data connection with the vzw800 APN following the existing https client logic. Similar actions may be taken with respect to other URL schemes such as, for example, http, https, file, inline, data, about, and JavaScript. That is, each of these URL schemes invokes their corresponding handler in the web browser 102a. Other implementations are contemplated. For example, additional URI schemes and handlers may be created to supplement the ones shown in FIG. 2. For example, URI schemes corresponding to the http-ims and http-admin may be created and may be associated with handler modules http-ims and http-admin, respectively. The http-ims module may set up a data connection with the vzwims APN; whereas, the http-admin module may set up a data connection with the vzwadmin APN.

If the web browser 102a determines that the handler is a specialized handler (Step 222), then the web browser 102a determines whether the handler is installed on the UE 102 (Step 224). If yes (Step 224, Yes), the web browser 102a starts the specialized handler (Step 226). The specialized handler may include YouTube, for example. If the handler is not installed on the UE 102 (Step 224, No), the web browser 102a starts searching for the specialized handler on the web (Step 228). Depending on the search result, the web browser 102a presents the user with the various options for handling the URL scheme. If the web browser 102a does not find the handler (Step 214, No), the web browser 102a translates the URL and searches for it on the web, for example, on X2Y3.com (Step 230). Depending on the search result, the web browser 102a presents the user with several options for handling the URL or informs the user that no result was found and asks the user to specify a specific handler for handling the URL.

As noted above, the new URI schemes can be used to allow for multiple APN connections support in the web browser 102a. Based on different URI schemes, the web browser 102a can differentiate and setup a connection with a specific APN. To illustrate a few examples, assume a customer using the UE 102 attempts to access X1Y2.com. To this end, the customer enters the URL www.X1Y2.com in the address bar of the web browser 102a. The web browser 102 parses the URL and identifies that the URL scheme corresponds to the http scheme. Therefore, the web browser 102 forwards the URL to the http handler. The http handler may set up the default (e.g., internet APN) data connection with the network 100 and then communicate with the network 100 to obtain the requested web page associated with X1Y2.com.

X1Y2.com may provide 800 free data service to the customer by adding a new URL link onto its homepage (X1Y2.com). The new URL link may include http-800:// www.X1Y2.com/customer_service. When the customer selects this link by, for example, clicking on it, the customer may be able to reach the X1Y2 customer service. X1Y2.com may inform the customer that the customer may be free of data charges for the data traffic usage that occurs during interaction with X1Y2 customer service. The customer, however, may be still responsible for other data traffic usage. Upon selection of the link, web browser 102a parses the URL link and identifies the selected URL associated with a new URI scheme http-800. The web browser 102a therefore forwards the URL to the http-800 module for handling. The http-800 module initiates the vzw800 PDN connection to the network 100.

The network 100 in response assigns the web browser 102a a new IP address for the vzw800 PDN which will be used for communicating 800 free data traffic to the network 100. The data traffic generated from this transaction is carried through vzw800 APN and is free of charge to the customer. Specifically, X1Y2 may inform the network 100 to not charge the customer for the data traffic associated with the vzw800 APN connection. Each APN connection may be considered as a different pipe from the UE 102 to the network 100. For example, the vzw800 APN may be considered as a first pipe between the UE 102 and the network 100 and the Internet APN may be considered a second pipe between the UE 102 and the network 100. To this end, the 800 free data traffic associated with the 800 free data URL travels through the first pipe to the network and the other traffic usage that occurs during the interaction with the X1Y2 web site may travel through the second pipe. The PGW 122 distinguishes the data coming from the first pipe and the second pipe based on, for example, the IP address associated with each pipe and references its internal record to determine whether the data traffic should be charged to the client. The internal record may indicate that the data traffic associated with the vzw800 APN should be charged to the destination IP address and the data traffic associated with the Internet APN should be charged to the user of the UE 102. In keeping with the previous example, therefore, the PGW 122 charges X1Y2 for data associated with the vzw800 APN (e.g., the first pipe) and the PGW 122 charges the customer for the data traffic associated with the Internet APN (e.g., the second pipe).

Other usages for the http-800 scheme are contemplated. For example, the customer interacting with an online movie service provider such as, for example, Netflix may pay for the data usage associated with watching a movie online using the UE 102 or Netflix may pay for such data usage. To this end, Netflix may inform the customer that if the customer subscribes to the Netflix service for a monthly fee, the customer may be able to watch the movie without the customer having to pay additional network-based data charges. Upon subscription to the Netflix service, Netflix may provide a customer with a URL link, which the customer can use to view movies without being charged for data. The URL link may be an 800 URL link which invokes the http-800 handler and results in establishing the vzw800 APN if one is not already established for the customer. If one is already established for the customer, a new data flow may be created on the vzw800 APN connection and Netflix data may be associated with the new session.

Other APN connections may be used for other purposes. The vzwapp APN may be used for sending Multimedia Messaging Service (MMS) messages to the UE 102. The vzwadmin APN may be used for administrative purposes. For example, the vzwadmin APN may be used for software update such as, for example, Operation System (OS) update to the UE 102. To illustrate further, assume a company such as, for example, X2Y3 wants to perform free Android OS software upgrade service for the customer's mobile device. X2Y3 may provide a URL to the customer to perform free Android OS software upgrade service. For example, X2Y3 may add a URL link http-admin://www.X2Y3.com/AndroidOS into X2Y3's homepage. The customer may click on this link to perform the software upgrade. In response, the web browser 102a parses the URL link http-admin:// www.X2Y3.com/AndroidOS and identifies the URI scheme is the http-admin. The web browser 102a then calls the new http-admin module to handle http-admin URI scheme. The http-admin module may use vzwadmin APN to set up connection to the admin PDN. The http-admin module may use the existing HTTP, TCP protocol stack to handle request/ response generated during this transaction. The data traffic generated from this transaction is carried through the vzwadmin APN to the admin PDN. If the customer clicks on other links on the X2Y3 homepage, the web browser 102 uses the http module to process the other links. The http module may use the Internet APN (e.g., default APN) to set up a network data connection and route the data traffic to the Internet PDN. Depending on the type of the APN used, the network 100 may or may not charge the customer for the network data traffic usage. For example, if the data traffic is associated with the vzwadmin APN, the network 100 may not charge the customer for the network data traffic usage. However, if the data traffic is associated with the Internet APN, the network 100 may charge the customer for the network data traffic usage.

In another implementation, the web browser 102a may provide multiple APN connections support using new port numbers in the standard URI syntax. The standard URI syntax may include <scheme name>: <hierarchical part> [?<query>] [#<fragment>]. The hierarchical part of the URI syntax may include an optional port segment. If the port segment is not specified in the URL syntax, a default port number may be used. The default port number may be port number 80. For example: http://www.X2Y3.com is associated with the port number 80. Another solution for allowing multiple APN connections support in the web browser 102a includes specifying new port number explicitly in the URL and using the port number to determine the APN for connection. For example, port numbers 65500-65503 may be reserved for APN setup purpose. The port number 65500 may be used to set up a data connection with vzw800 APN. The port number 65501 may be used to set up a data connection with vzwapp APN. The port number 65502 may be used for setting up a data connection with vzwims APN. The port number 65503 may be used for setting up a data connection with vzwadmin APN. The default port number 80 may be used for setting up a data connection with default APN (e.g., vzwinternet APN). After determining the proper handler module associated with the URL, the web browser 102a forwards the URL to the handler module for processing. The handler module determines the port number associated with the URL and sets up the APN connection associated with the identified port number. After determining the port number used in the URL, the handler module may replace the port number with the official port number assigned for URI scheme to continue processing (e.g., setting up http/https connection, setting up UDP/TCP connection, setting up a data connection).

Figure 3A:
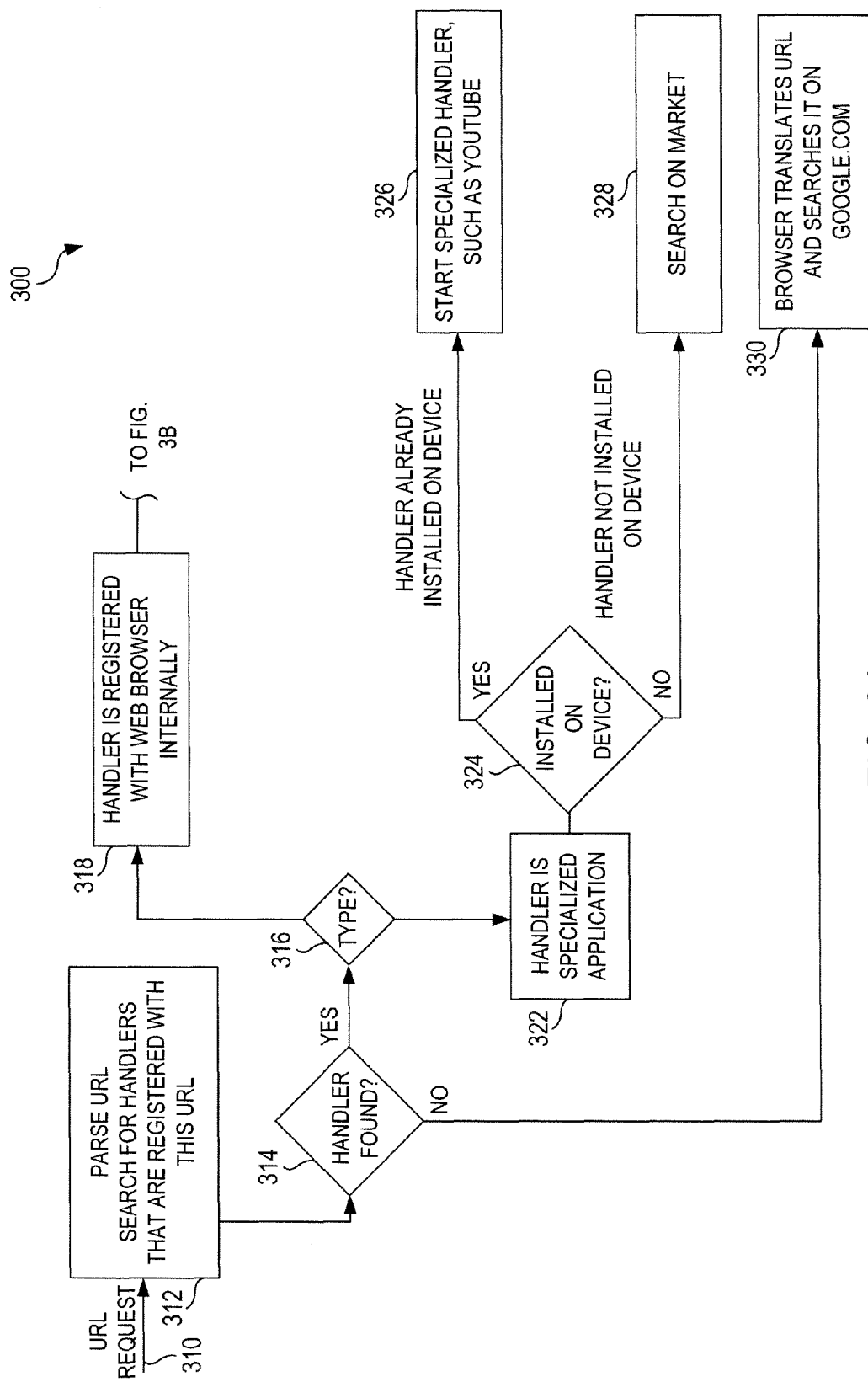
FIGS. 3A-3B illustrate another exemplary flow for providing multiple APN connections support in the web browser shown in FIG. 1 using new port numbers in the URI syntax.
Figure 3B:
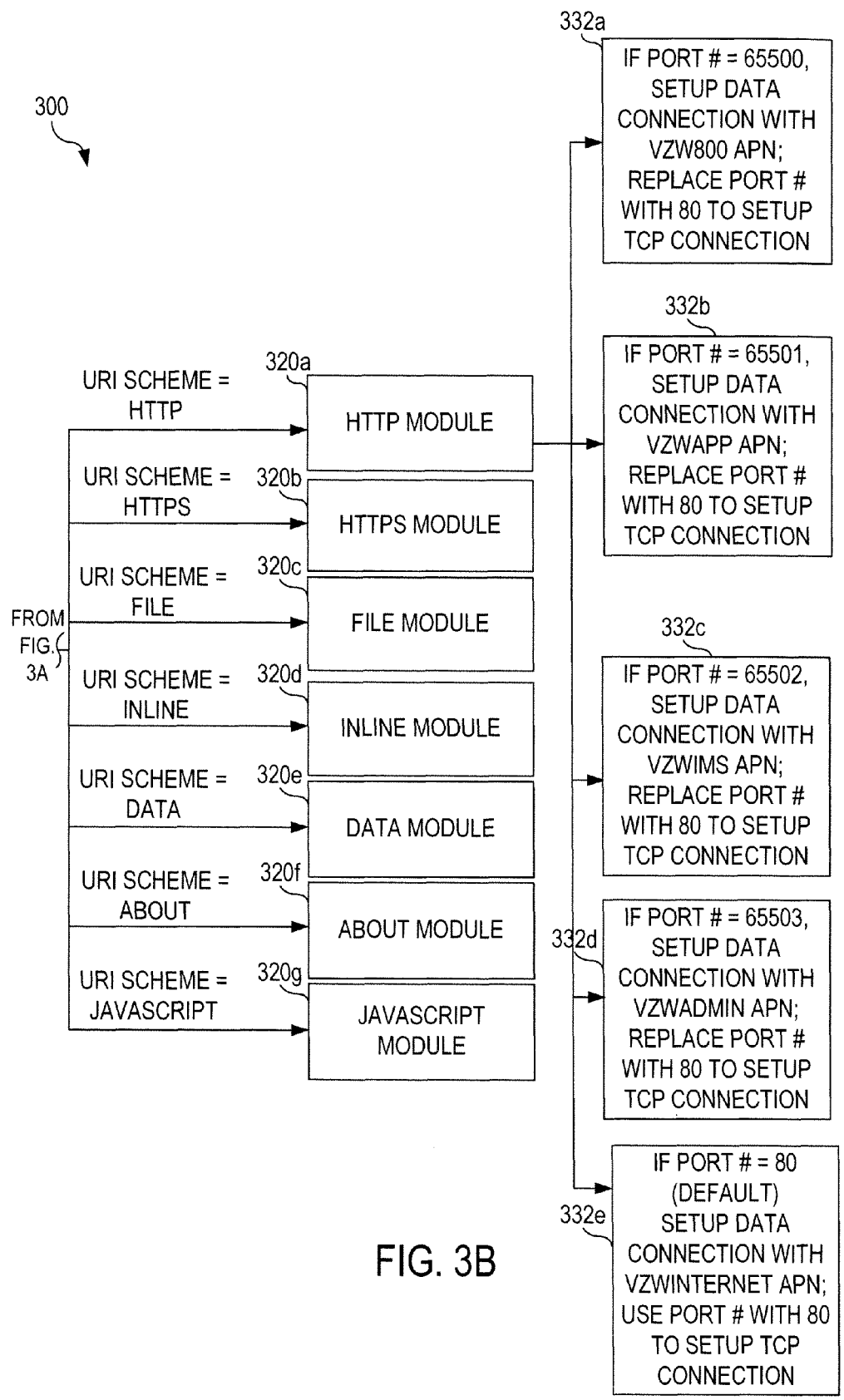

FIGS. 3A-3B illustrate another exemplary flow 300 for providing multiple APN connections support in the web browser 102a using new port numbers in the URI syntax. The flow 300 includes receiving a URL request (Step 310). The URL request may be entered by the user interacting with the web browser 102a. Alternatively, the URL request may be received as a result of the user selecting a specific link on a particular web site. In either case, the web browser 102a parses the URL to search for handlers that are registered with the received URL (Step 312). If a handler is found (Step 314, Yes), the web browser 102a determines the type of handler (Step 316). If the handler is registered with the web browser 102a internally (Step 318), the web browser 102a determines the type of URI scheme invoked by the URL and depending on the type of URI scheme invoked by the URL, the web browser 102a forwards the URL for processing to one of the handler modules 320a-320g as shown in FIG. 3B. For example, when the web browser 102a parses the URL scheme and identifies that the URL scheme corresponds to the http scheme, the web browser 102a calls the corresponding http module 320a. In response, the http module 320a identifies the port number in the URL and depending on the port number will take an appropriate action.

To illustrate, if the port number is 65500 (Step 332a), the http module 320a uses vzw800 APN to set up a network data connection; follows the existing protocol stack to handle request/response messages; and replaces the port number 65500 with port number 80 to set up the TCP connection. The port number 80 indicates to the Internet PDN that this traffic is for the http application. If the port number is 65501 (Step 332b), the http module 320a uses the vzwapp APN to set up a network data connection; follow the existing protocol stack to handle request/response messages; and replaces the port number 65501 with port number 80 to set up the TCP connection. If the port number is 65502 (Step 332c), the http module 320a uses the vzwims APN to set up a network data connection; follows the existing protocol stack to handle request/response messages; and replaces the port number 65502 with port number 80 to set up the TCP connection. If the port number is 65503 (Step 332d), the http module 320a uses vzwadmin APN to set up a network data connection; follows the existing protocol stack to handle request/response messages; and replaces the port number 65503 with the port number 80 to set up the TCP connection. If the port number is default (Step 332e), the http module 320a uses the default APN (e.g., vzwinternet APN) to set up the network data connection. Although not shown, other handler modules 320b-320g may take similar action as the http module 320a.

For example, when the web browser 102a parses the URL scheme and identifies that the URL scheme corresponds to the https scheme, the web browser 102a calls the corresponding https module 320b. In response, the https module 320b identifies the port number in the URL and depending on the port number will take one of the actions 332a-332e. However, instead of replacing the identified port number with the port number 80, the https module 320b replaces the identified port number with the port number associated with the https scheme.

If the web browser 102a determines that the handler is a specialized handler (Step 322), then the web browser 102a determines whether the handler is installed on the UE 102 (Step 324). If yes (Step 324, Yes), the web browser 102a starts the specialized handler (Step 326). The specialized handler may include YouTube, for example. If the handler is not installed on the UE 102 (Step 324, No), the web browser 102a starts searching for the specialized handler on the web (Step 328). Depending on the search result, the web browser 102a presents the user with the various options for handling the URL scheme. If the web browser 102a does not find the handler (Step 314, No), the web browser 102a translates the URL and searches for it on the web, for example, on X2Y3.com (Step 330). Depending on the search result, the web browser 102a presents the user with several options for handling the URL or informs the user that no results were found and asks the user to specify a specific handler for handling the URL.

As noted above, the new port numbers can be used to allow for multiple APN connections support in the web browser 102a. Based on different port numbers used in the URL, the web browser 102a can differentiate and set up connection with a specific APN. In keeping with the previous example, assume the customer using the UE 102 attempts to access X1Y2.com. To this end, the customer enters the URL www.X1Y2.com in the address bar of the web browser 102a. The web browser 102 parses the URL and identifies that the URL scheme corresponds to the http scheme. Therefore, the web browser 102 forwards the URL to the http handler. The http handler may set up the default (e.g., internet APN) data connection with the network 100 since no port number is specified in the URL and then communicate with the network 100 to obtain the requested web page associated with X1Y2.com.

X1Y2.com may provide 800 free data service to the customer by adding a new URL link into its homepage (X1Y2.com). The new URL link in this case may include http://www.X1Y2.com/customer_service:65500. When the customer selects this link by, for example, clicking on it, the customer may be able to contact the X1Y2 customer service. As noted previously, the data traffic usage occurred during interaction with the X1Y2 customer service may be free to the customer. The customer, however, may still be responsible for other data traffic usage. To distinguish between these two types of traffic, the web browser 102a uses the new port numbers to establish separate APN connections to the network (e.g., vzw800 APN connection and the default APN connection).

Upon selecting the link, the web browser 102a parses the URL link and identifies that the selected URL is associated with the URI scheme http. The web browser 102a therefore forwards the URL to the http module 320a for handling. The http module 320a identifies the port number in the URL and depending on the port number will take an appropriate action. Since in this example the port number is 65500, the http module 320a uses vzw800 APN to set up a network data connection; follows the existing protocol stack to handle request/response messages; and replaces the port number 65500 with port number 80 to set up the TCP connection. The port number 80 indicates to the Internet PDN that this traffic is for the http application. All data traffic from this transaction may be carried over the vzw800 APN and is free of charge to customer. If, however, the customer selects other URL links on the X1Y2.com homepage, the other URLs do not specify the port number. Therefore, the http module 320a determines that the default port number 80 is to be used and initiates the default APN connection to the vzwinternet PDN connection. The traffic associated with the other URL selected links while using X1Y2.com may be carried over vzwinternet PDN and may be charged to the customer.

In another implementation, the web browser 102a may provide multiple APN connections support using query parameter in the standard URI syntax. As noted above, the standard URI syntax may include <scheme name>:<hierarchical part>[?<query>] [#<fragment>]. The query is an optional part, separated by a question mark ("?"), that contains additional identification information that is not hierarchical in nature. The query string syntax is commonly organized as a sequence of <key>=<value> pairs, with the pairs separated by a semicolon or an ampersand. For example: http://www.X2Y3.com:80?apn=vzw800. Another solution for allowing multiple APN connections support in the web browser 102a includes appending a new query parameter apn into URL and using the apn to determine the APN for connection. For example, apn=vzw800 may be used for setting up a data connection with the vzw800 APN. The apn=vzwapp may be used for setting up a data connection with the vzwapp APN. The apn=vzwIMS may be used for setting up a data connection with the vzwIMS APN. The apn=vzwadmin may be used for setting up a data connection with the vzwadmin APN. If no apn is included in the URL, the web browser 102a may set up a data connection with the default APN (e.g., vzwinternet APN).

After identifying the proper handler module associated with the URL, the web browser 102a forwards the URL to the identified handler module for processing. If an apn is included in the URL, the handler module uses the apn value to set up the proper data connection. The handler module may report the query parameter from the URL. If an apn is not included in the URL, the handler module uses the default apn value (e.g., vzwinternet APN) to set up the data connection.

Figure 4A:
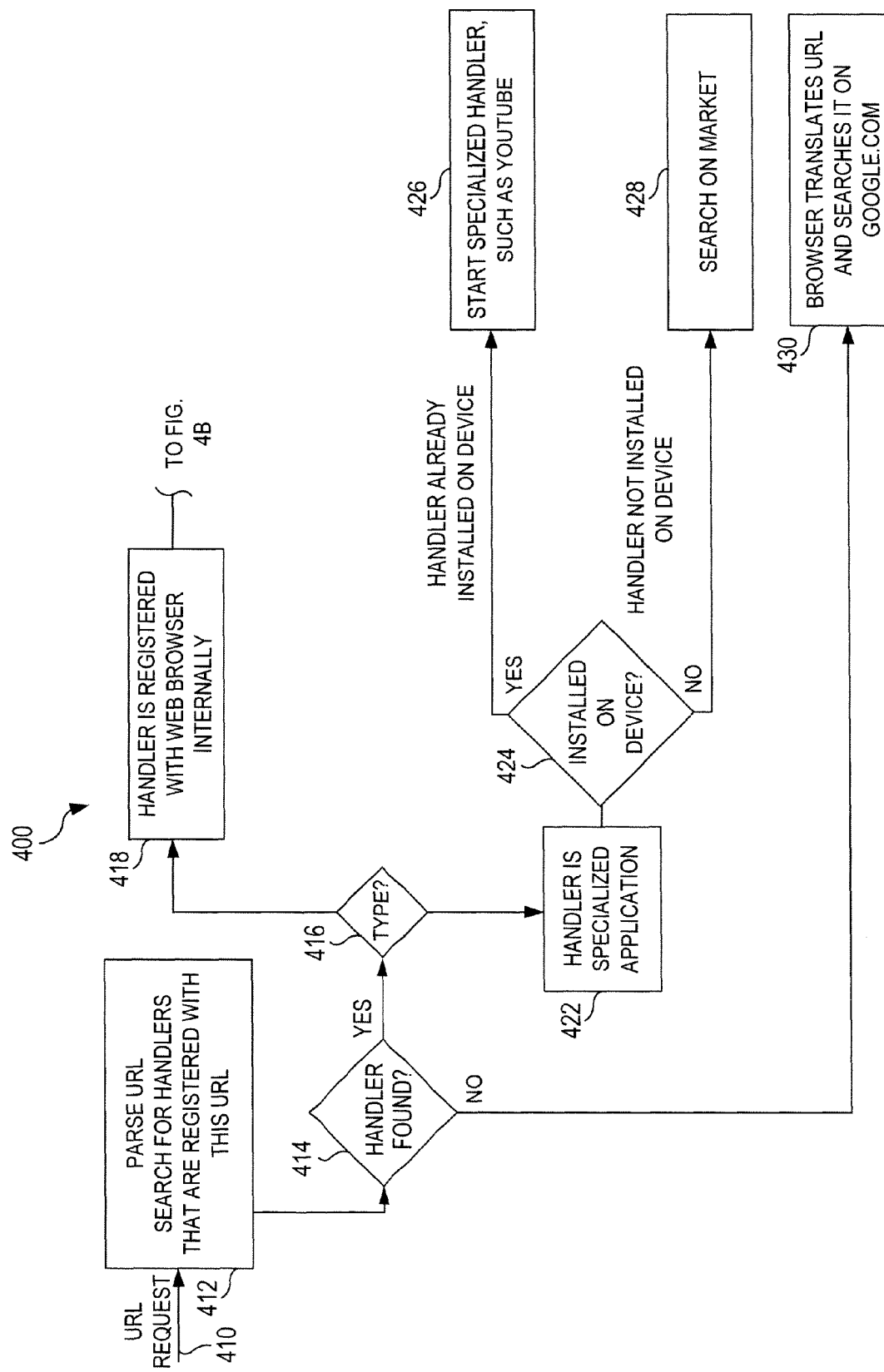
FIGS. 4A-4B illustrate another exemplary flow for providing multiple APN connections support in the web browser shown in FIG. 1 using new query parameters in the URI syntax.
Figure 4B:
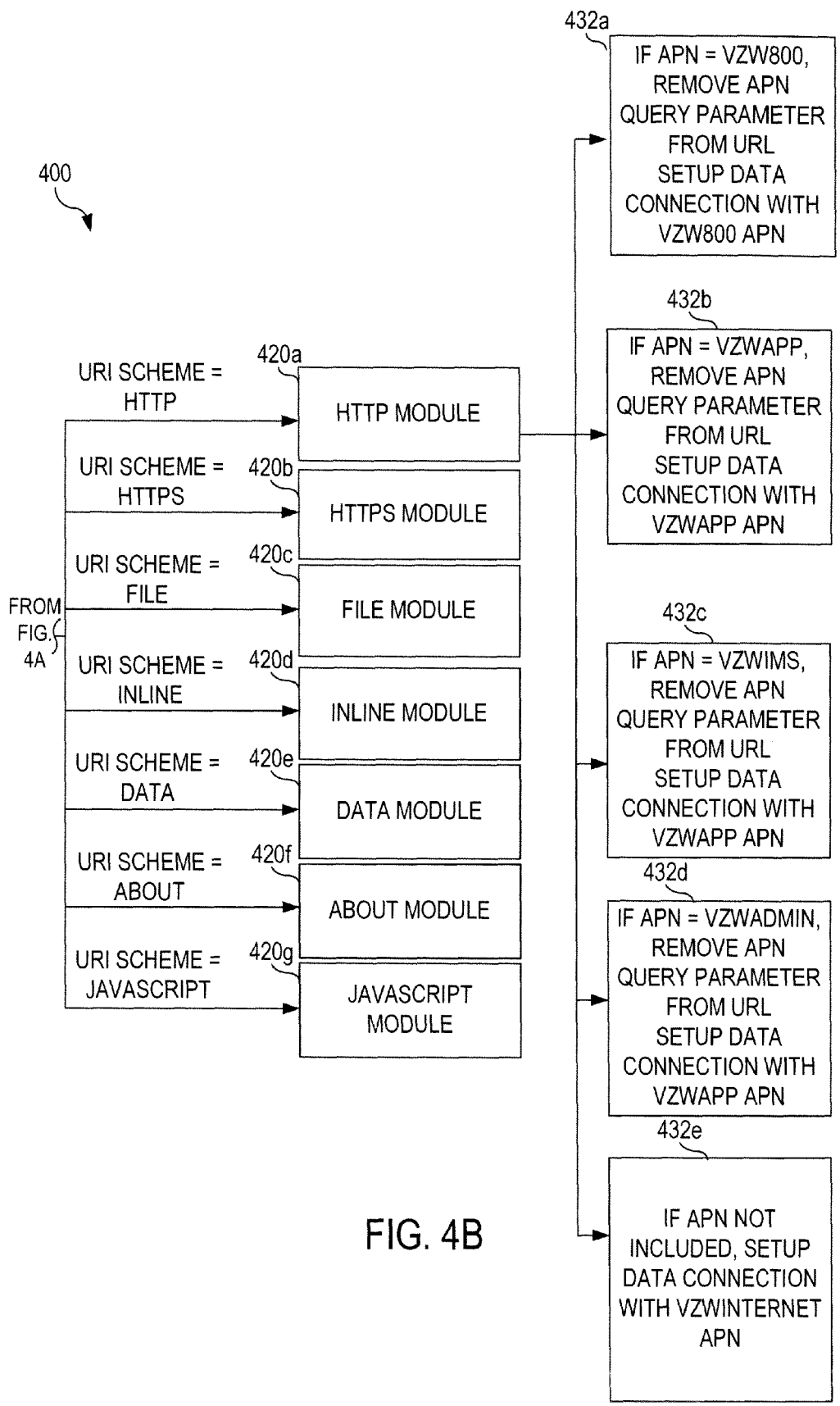

FIGS. 4A-4B illustrate another exemplary flow 400 for providing multiple APN connections support in the web browser 102a using new query parameters in the URI syntax. The flow 400 includes receiving a URL request (Step 410). The URL request may be entered by the user interacting with the web browser 102a. Alternatively, the URL request may be received as a result of the user selecting a specific link on a particular web site. In either case, the web browser 102a parses the URL to search for handlers that are registered with the received URL (Step 412). If a handler is found (Step 414, Yes), the web browser 102a determines the type of handler (Step 416). If the handler is registered with the web browser 102a internally (Step 418), the web browser 102a determines the type of URI scheme invoked by the URL and depending on the type of URI scheme invoked by the URL, the web browser 102a forwards the URL for processing to one of the handler modules 420a-420g as shown in FIG. 4B. For example, when the web browser 102a parses the URL scheme and identifies that the URL scheme corresponds to the http scheme, the web browser 102a calls the corresponding http module 420a. In response, the http module 420a identifies the apn in the URL and depending on the apn will take an appropriate action.

To illustrate, if the apn query specifies vzw800 (Step 432a), the http module 420a removes the apn query from the URL and uses vzw800 APN to set up the network data connection. If the apn query specifies vzwapp (Step 432b), the http module 420a removes the apn query from the URL and uses the vzwapp APN to set up the network data connection. If the apn query specifies vzwims (Step 432c), the http module 420a removes the apn query from the URL and uses the vzwims APN to set up the network data connection. If the apn query is vzwadmin (Step 432d), the http module 420a removes the apn query from the URL and uses vzwadmin APN to set up the network data connection. If no apn query is included in the URL (Step 432e), the http module 420a uses the default APN (e.g., vzwinternet APN) to set up the network data connection. Although not show, other handler modules 420b-420g may take similar action as the http module 420a. For example, when the web browser 102a parses the URL scheme and identifies that the URL scheme corresponds to the https scheme, the web browser 102a calls the corresponding https module 320b. In response, the https module 320b identifies the apn query in the URL and depending on the apn query will take one of the actions 432a-432e.

If the web browser 102a determines that the handler is a specialized handler (Step 422), then the web browser 102a determines whether the handler is installed on the UE 102 (Step 424). If yes (Step 424, Yes), the web browser 102a starts the specialized handler (Step 426). The specialized handler may include YouTube, for example. If the handler is not installed on the UE 102 (Step 424, No), the web browser 102a starts searching for the specialized handler on the web (Step 428). If the web browser 102a does not find the handler (Step 414, No), the web browser 102a translates the URL and searches for it on the web, for example, on X2Y3.com (Step 430). Depending on the search result, the web browser 102a presents the user with several options for handling the URL or informs the user that no result was found and asks the user to specify a specific handler for handling the URL.

To illustrate a few examples, when the web browser 102a receives the URL http://www.X2Y3.com?apn=vzw800, the web browser 102a decodes the URI scheme and calls the http module 420a to handle URI scheme. Since the apn query is vzw800, the http module 420a sets up a data connection with the vzw800 APN. When the web browser 102a receives the URL http://www.X2Y3.com?apn=vzwapp, the web browser 102a again calls the http module 420a to handle URI scheme. Since the apn query is vzwapp, the http module 420a sets up a data connection with the vzw800 APN. When the web browser 102a receives the URL http://www.X2Y3.com, the web browser 102a again calls the http module 420a to handle URI scheme. Since no apn query is specified in the URL, the http module 420a sets up a data connection with the default APN.

Figure 5A:
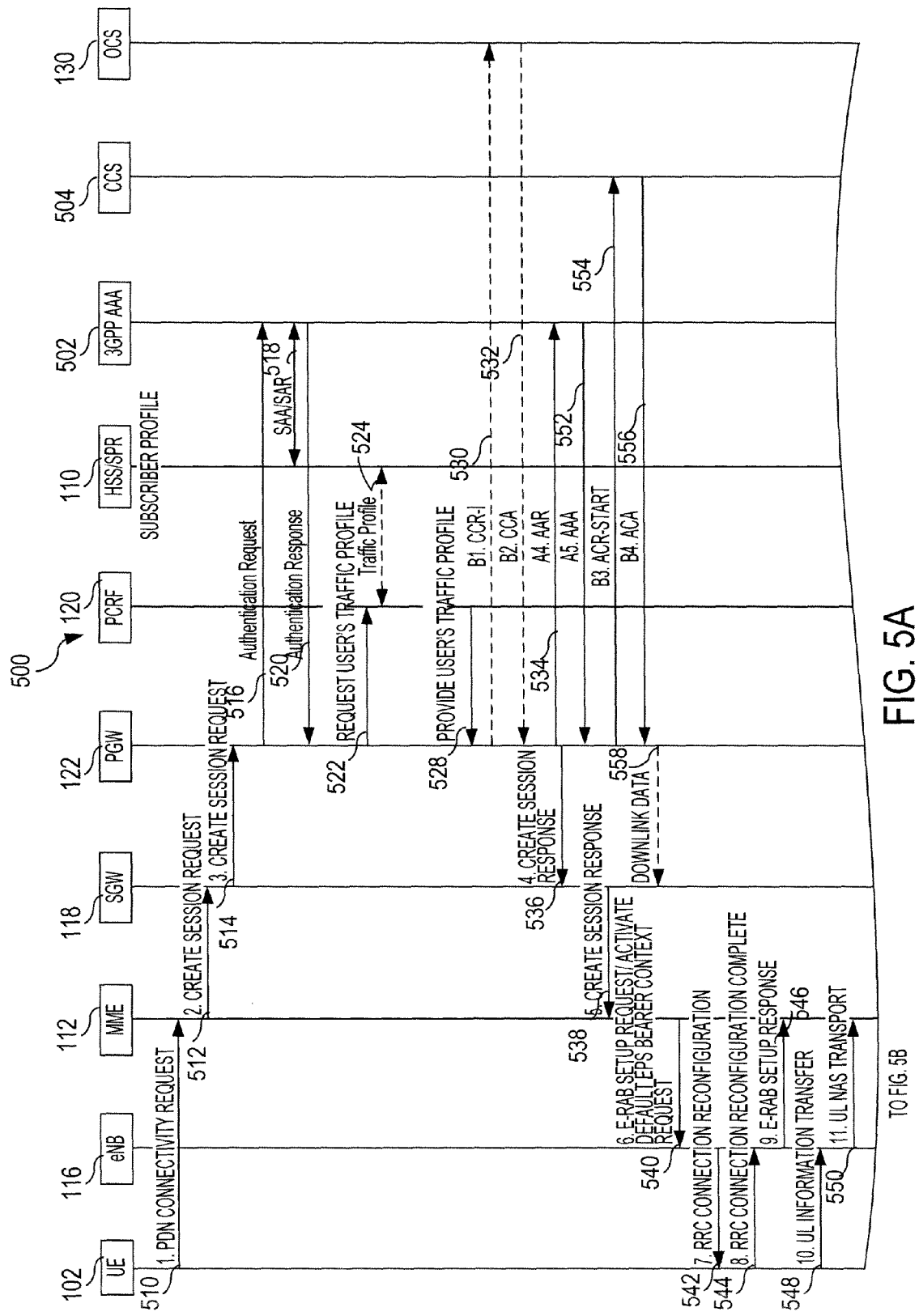
FIGS. 5A-5B illustrate an exemplary process for establishing a data connection between the UE and the network shown in FIG. 1.
Figure 5B:
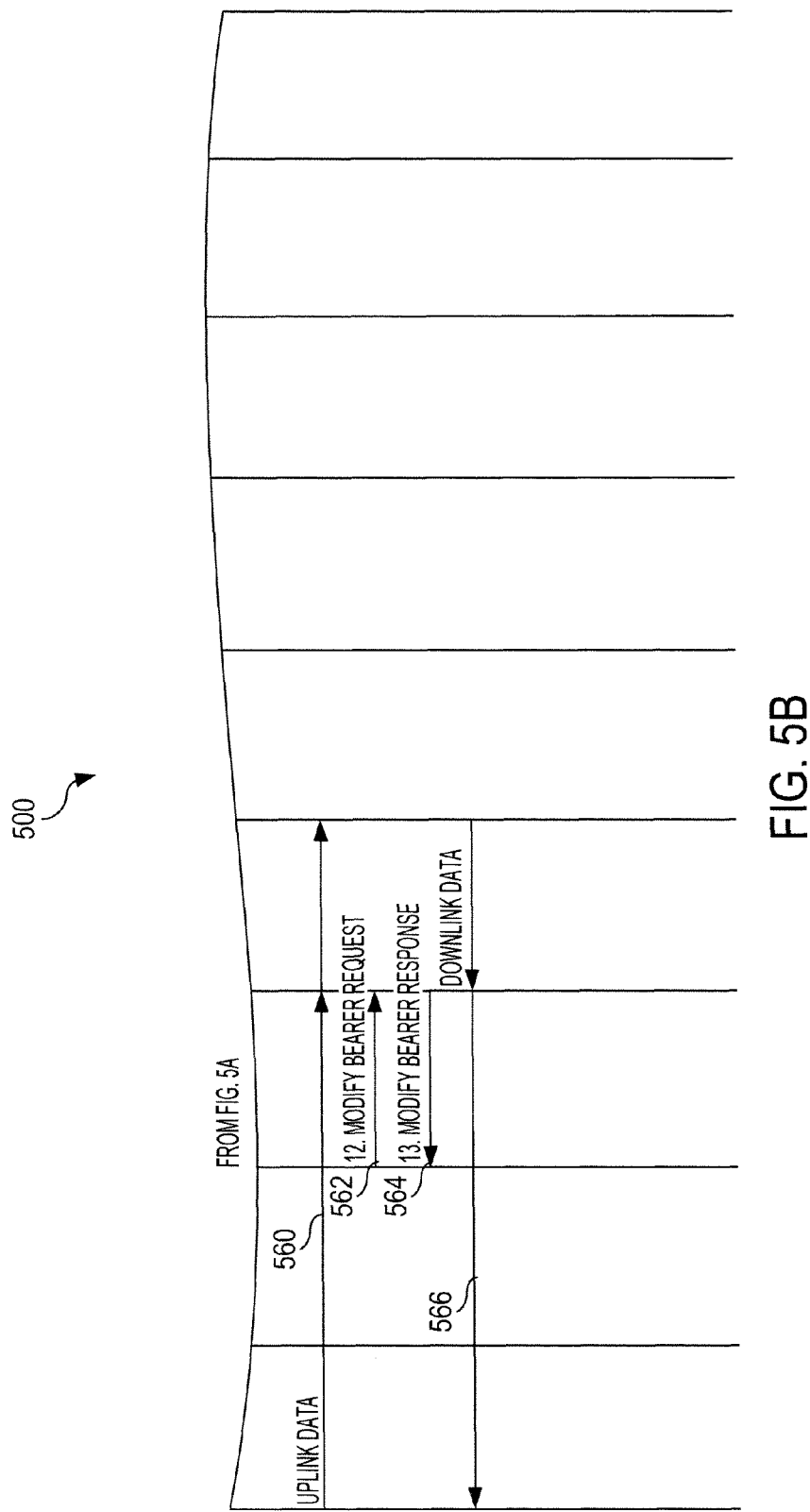

FIGS. 5A-5B illustrate an exemplary process 500 for establishing a data connection between the UE 102 and the network 100. The elements performing the various steps of the process 500 include UE 102, eNB 116, MME 112, SGW 118, PGW 122, PCRF 120, HSS 110, and OCS 130. These elements are similar to those shown in FIG. 1. Therefore, for the sake of brevity of description and simplicity, they are not described here in more detail. The process 500 also involves AAA 502 and CCF 504. The AAA 502 authenticates the PDN connection requests received from the UE 102. For example, the AAA 502 determines whether the UE 102 is authorized to request a specific APN connection. The CCF 504 acts as a counter and keeps track of the data usage associated with different data connections between the UE 102 and the network 100.

The process 500 begins with the UE 102 initiating a new PDN connection request to the MME 112 via the eNB 116 (Step 510). The PDN connection request may specify the type of the APN associated with the PDN data connection. The APN associated with the data connection may correspond to the default APN, the vzw800 APN, the vzwapp APN, the vzwims APN, or the vzwadmin APN. In keeping with the previous example, it is assumed that the APN corresponds to the vzw800 APN. The request for vzw800 APN connection is sent to the MME 112 the first time the device launches the 800 APN data service by, for example, selecting the http-800:// www.X1Y2.com/customer_service link on X1Y2 web site. If such APN connection already exists, the UE 102 does not create a new connection and instead creates a new data flow with a new session ID over the existing APN connection.

The MME 112 receives the connection request and in response sends a Create Session Request message to the SGW 118 (Step 512). The SGW 118 forwards the Create Session Request message to the PGW 122 (Step 514). The MME's 112 selection of the SGW 118 and the PGW 122 depends on configuration parameters specified in the PDN connection request. For example, the MME 112 may select the SGW 118 and the PGW 122 based on the APN specified in the connection request. Specifically, the MME 112 identifies the PGW 122 that provides the specified APN connectivity and that is closest to the subscriber location. Based on the identified PGW 122, the MME 112 selects the SGW 118.

The PGW 122 receives the Create Session Request message and performs authentication before creating a session and providing the UE 102 with a session response. To this end, the PGW 122 sends an authentication request to the AAA server 502 (Step 516). The authentication request may seek to authenticate the user's request to establish the vzw800 APN connection. The AAA server 502 may authenticate the user's access request based on its internal record and/or based on interacting with the HSS 110 (Step 518). In either case, the AAA server 502 sends the authentication result to the PGW 122 (Step 520). Assuming the user is authorized to access the vzw800 APN, the PGW 122 then determines the traffic profile for the user by sending IP-CAN Session Establishment Procedure message to the PCRF 120 (Step 522). If the PCRF 120 does not have the user's traffic profile, the PCRF downloads user's traffic profile from the HSS 110 (Step 524). If there is no subscription to profile update notification for the user, the PCRF 120 may subscribe to profile update notification. The user's traffic profile may specify whether the user is a pre-paid customer or a post-pay customer and the speed rate associated with the UE 102. The PCRF 120 forwards the user's traffic profile to the PGW 122 (Step 528).

The PGW 122 determines whether the user is a pre-paid customer or a post-pay customer based on the user's traffic profile. If the user is a pre-paid customer, the PGW 122 will check with the OCS 130 to determine whether the user has sufficient funds available for establishing the PDN data connection (Step 530). The OCS 130 provides the PGW 122 with a response regarding the sufficiency of the user's fund for establishing the PDN data connection (Step 532). If the user does not have sufficient funds and the user is a pre-paid customer, the PGW 122 denies the session request and informs the user of the same. If the user has sufficient fund or the user is a post-pay customer, the PGW 122 sends a Create Session Response message to the SGW 118 (Step 536). The Create Session Response message includes an IP address for the PDN data connection. The PGW 122 also sends an AAR message to the AAA server 502 informing the AAA server 502 of the IP address that is being assigned to the UE 102 (Step 534). The AAA server 502 responds with AAA message (552) confirming receipt and providing session ID and result code. After the PDN session establishment is complete, the PGW 122 sends an ACR-Start message to the CCF 504 (Step 554). The CCF 504 responds with an ACA message to the PGW 122 (Step 556). The start message will indicate to the CCF 504 to start the timer associated with this data session. The PGW 122 also sends a downlink data to the SGW 118 (Step 558) informing the SGW 118 that the network 100 is ready to accept and download data to the UE 102.

The SGW 118 forwards the Create Session Response message to the MME 112 (Step 538), which will forward E-RAB Setup Request message to the eNB 116 (Step 540). In response, the eNB 116 sends an RPC Connection Reconfiguration message to the UE 102 (Step 542). The RPC Connection Reconfiguration message assigns the IP address to the UE 102 and provides the UE 102 with the radio bearer identity of the eNB 116 for communication with the network 100. The UE 102 informs the eNB 116 that it has completed configuration by sending an RPC Connection Reconfiguration Complete message to the eNB 116 (Step 544). In response, the eNB 116 forwards an E-RAB Setup Response message to the MME 112 (Step 546). The E-RAB Setup Response message indicates to the MME 112 that the UE 102 is in connected mode and can communicate with the network 100. Thereafter, the UE 102 sends to the eNB 116 a UL Information Transfer message (Step 548). The UL Information Transfer message informs the network 100 that the UE 102 is ready to upload data to the network 100. In response, the eNB 116 forwards UL NAS Transport message to the MME 112 (Step 550).

The MME 112 sends a Modify Bearer Request message to the SGW 118 (Step 562). The Modify Bearer Request message informs the SGW 118 of the name of eNB 116 serving the UE 102. The SGW 118 notes the eNB's 116 name and responds back to the MME 112 with a Modify Bearer Response (Step 564). From this point forward, the data communication may happen directly between the UE 102 and the PGW 122 without having to go to the MME 112. Therefore, when the customer uploads data (e.g., pictures) or downloads data from the Internet, the data will not go through the MME 112.

To this end, a web browser is described that is configured to provide multiple APN connections support to the communication network. Each APN connection may correspond to a different communication tunnel between the device hosting the web browser and a specific PDN. To this end, the web browser can set up data connections with different APNs based on the selected URL. After a data connection with a specific APN is created, data traffic generated from the web browser may be carried through the specific APN.

In one general aspect, a method is described that includes steps of receiving, at a web browser application installed on a device, a first URL; determining via the web browser application installed on the device a first APN network identifier associated with the first URL; and establishing a first data connection based on the first APN network identifier between the device and a network. The method further includes steps of receiving, at the web browser application installed on the device, a second URL; determining via the web browser application installed on the device a second APN network identifier associated with the second URL; and establishing a second data connection based on the second APN network identifier between the device and the network.

The above general aspect may include one or more of the following features. Determining the first APN network identifier may include determining the first APN network identifier based on a first scheme name associated with the first URL, and determining the second APN network identifier may include determining the second APN network identifier based on a second scheme name associated with the second URL. Establishing the first data connection may include establishing the first data connection using a first handler module associated with the first scheme name, and establishing the second data connection may include establishing the second data connection using a second handler module associated with the second scheme name.

The first scheme name may include an http-app, an https-app, an http-800, or an https-800. The first handler module may include an http-app module, an https-app module, an http-800 module, or an https-800 module. The first data connection may include a connection to an application Public Data Network (PDN) or an 800 PDN. The second scheme name may include an http or an https. The second handler module may include an http module or an https module. The second data connection may include a connection to Internet PDN.

Determining the first APN network identifier may include determining the first APN network identifier based on a first port number included within the first URL, and determining the second APN network identifier may include determining the second APN network identifier based on a second port number associated with the second URL. The first data connection may include a connection to an app PDN, an admin PDN, an 800 PDN, or an IP Multimedia System (IMS) PDN, and the second data connection may include a connection to Internet PDN. Determining the first APN network identifier may include determining the first APN network identifier based on a first query string syntax included within the first URL, and determining the second APN network identifier may include determining the second APN network identifier based on a second query string syntax associated with the second URL. The first and second data connections may be established at the same time.

The first query string syntax may appear after a domain server name associated with the first URL and after a question mark. The first data connection may include a connection to an app PDN, an admin PDN, an 800 PDN, or an IP Multimedia System (IMS) PDN, and the second data connection may include a connection to Internet PDN. Establishing the first data connection may include: sending, from the device to the network, a first data connection request for authentication, and receiving, from the network and at the device, a first IP address in response to the first data connection request. Establishing the second data connection may include: sending, from the device to the network, a second data connection request for authentication, and receiving, from the network and at the device, a second IP address in response to the second data connection request.

The method may further include steps of sending, from the web browser and over the first data connection, data associated with the first URL to the network; and sending, from the web browser and over the second data connection, data associated with the second URL to the network.

In another general aspect, a method is described that includes steps of: receiving, at a web browser application installed on a device, a URL; selecting from a plurality of APNs an APN associated with the URL; establishing a communication tunnel between an enterprise associated with the URL and the device based on the selected APN; and communicating with the enterprise through the established communication tunnel. Each of the plurality of APNs is associated with a different communication tunnel between the enterprise and the device. The different communication tunnel may include a communication tunnel associated with an app PDN, an admin PDN, an 800 PDN, or an IMS PDN.

These general and specific aspects may be implemented using a system, a method, a computer program, a computer readable medium, or an apparatus or any combination of systems, methods, computer programs, computer readable mediums, and/or apparatuses.

As shown by the above discussion, functions relating to providing multiple APN connections support in the web browser may be implemented on computers connected for data communication via the components of a packet data network, operating as a PGW 122 and the PDN 124 as shown in FIG. 1. Although special purpose devices may be used, such devices also may be implemented using one or more hardware platforms intended to represent a general class of data processing device commonly used to run "server" programming so as to implement the multiple APN connections function on the web browser discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for allowing multiple APN connections support on the web browser. The software code is executable by the general-purpose computer that functions as the UE 102. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for enabling multiple APN connections support on the web browser, in essentially the manner performed in the implementations discussed and illustrated herein.

Figures 6, 7:
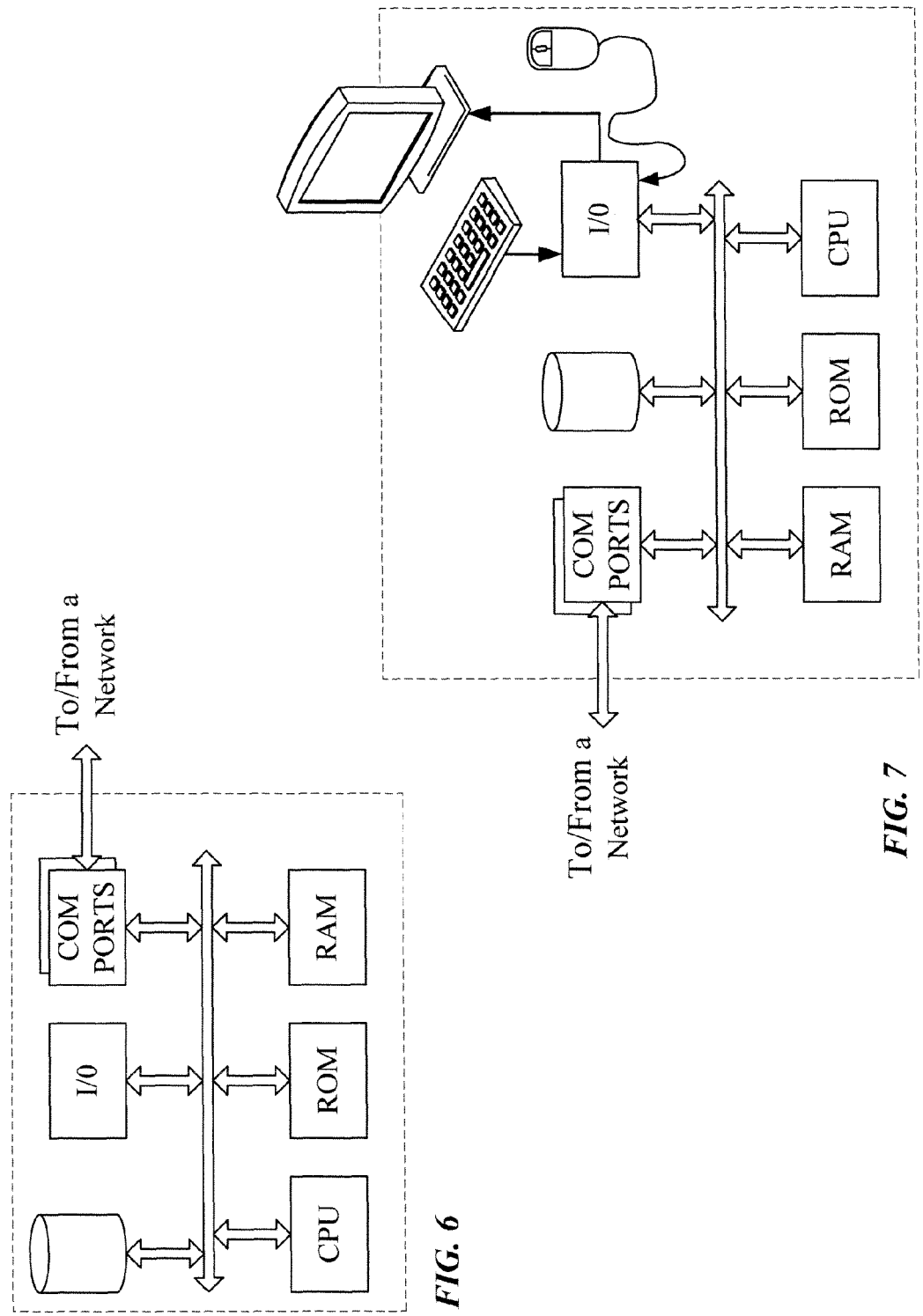
FIG. 6 is a simplified functional block diagram of a computer that may be configured to function as any of the devices of FIG. 1.
FIG. 7 is a simplified functional block diagram of a personal computer or other work station or terminal device that may be configured to function as any of the devices of FIG. 1.

FIGS. 6 and 7 provide functional block diagram illustrations of general purpose computer hardware platforms. FIG. 6 illustrates a network or host computer platform, as may typically be used to implement a server. FIG. 7 depicts a computer with user interface elements, as may be used to implement a personal computer or other type of work station or terminal device, although the computer of FIG. 7 may also act as a server if appropriately programmed. It is believed that the general structure and general operation of such equipment as shown in FIGS. 5 and 6 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 7). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, aspects of the methods of providing multiple APN connections support outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the communication network provider into the computer platform of the UE 102. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the multiple APN connections support on the web browser shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
receiving, at a web browser application installed on a device, a first Uniform Resource Locator (URL);
determining by the web browser application installed on the device a first Access Point Name (APN) network identifier associated with the first URL;
establishing a first data connection based on the first APN network identifier between the device and a network;
receiving, at the web browser application installed on the device, a second URL;
determining by the web browser application installed on the device a second APN network identifier associated with the second URL; and
establishing a second data connection based on the second APN network identifier between the device and the network,
wherein each of the first and second data connections includes a connection to an Internet packet data network (PDN), an app PDN, an admin PDN, an 800 PDN, or an IP Multimedia System (IMS) PDN,
when the first data connection is connected to the Internet PDN, the second data connection is connected to one of the app PDN, the admin PDN, the 800 PDN, or the IMS PDN, and
when the first data connection is connected to one of the app PDN, the admin PDN, the 800 PDN, or the IMS PDN, the second data connection is connected to the Internet PDN.

2. The method of claim 1, wherein:
determining the first APN network identifier includes determining the first APN network identifier based on a first scheme name associated with the first URL, and
determining the second APN network identifier includes determining the second APN network identifier based on a second scheme name associated with the second URL.

3. The method of claim 2, wherein:
establishing the first data connection includes establishing the first data connection using a first handler module associated with the first scheme name, and
establishing the second data connection includes establishing the second data connection using a second handler module associated with the second scheme name.

4. The method of claim 3, wherein:
the first scheme name includes a http-app, a https-app, a http-800, or a https-800,
the first handler module includes a http-app module, a https-app module, a http-800 module, or a https-800 module,
the first data connection includes a connection to an application Public Data Network (PDN) or an 800 PDN,
the second scheme name includes a http or a https,
the second handler module includes a http module or a https module, and
the second data connection includes a connection to Internet PDN.

5. The method of claim 1, wherein:
determining the first APN network identifier includes determining the first APN network identifier based on a first port number included within the first URL, and
determining the second APN network identifier includes determining the second APN network identifier based on a second port number associated with the second URL.

6. The method of claim 5, wherein:
the first data connection includes a connection to an app PDN, an admin PDN, an 800 PDN, or an IP Multimedia System (IMS) PDN, and
the second data connection includes a connection to Internet PDN.

7. The method of claim 1, wherein:
determining the first APN network identifier includes determining the first APN network identifier based on a first query string syntax included within the first URL, and
determining the second APN network identifier includes determining the second APN network identifier based on a second query string syntax associated with the second URL.

8. The method of claim 7, wherein the first query string syntax appears after a domain server name associated with the first URL and after a question mark.

9. The method of claim 1, wherein:
establishing the first data connection includes:
sending, from the device to the network, a first data connection request for authentication, and
receiving, from the network and at the device, a first IP address in response to the first data connection request, and
establishing the second data connection includes:
sending, from the device to the network, a second data connection request for authentication, and
receiving, from the network and at the device, a second IP address in response to the second data connection request.

10. The method of claim 1, further comprising:
sending, from the web browser and over the first data connection, data associated with the first URL to the network; and
sending, from the web browser and over the second data connection, data associated with the second URL to the network.

11. The method of claim 1, further comprising:
prior to establishing the first data connection, modifying the first URL or a uniform resource indicator associated with the first URL by removing or replacing parameters respectively in the first URL or uniform resource indicator associated with the first URL.

12. The method of claim 1, further comprising:
parsing by the web browser application a Uniform Resource Indicator (URI) scheme associated with the first URL, and
mapping the URI scheme to the first APN network identifier for establishing the first data connection to the network.

13. A device comprising:
a processor; and
a memory storing executable instructions for causing the processor to:
receive, at a web browser application installed on the device, a first Uniform Resource Locator (URL);
determine a first Access Point Name (APN network identifier associated with the first URL;
establish a first data connection based on the first APN network identifier with a network;
receive, at the web browser application installed on the device, a second URL;
determine a second APN network identifier associated with the second URL; and
establish a second data connection based on the second APN network identifier with the network, wherein each of the first and second data connections includes a connection to an Internet packet data network (PDN), an app PDN, an admin PDN, an 800 PDN, or an IP Multimedia System (IMS) PDN, when the first data connection is connected to the Internet PDN, the second data connection is connected to one of the app PDN, the admin PDN, the 800 PDN, or the IMS PDN, and when the first data connection is connected to one of the app PDN, the admin PDN, the 800 PDN, or the IMS PDN, the second data connection is connected to the Internet PDN.

14. The device of claim 13, wherein:
to determine the first APN network identifier the memory stores executable instructions for causing the processor to determine the first APN network identifier based on a first scheme name associated with the first URL, and
to determine the second APN network identifier the memory stores executable instructions for causing the processor to determine the second APN network identifier based on a second scheme name associated with the second URL.

15. The device of claim 14, wherein:
to establish the first data connection the memory stores executable instructions for causing the processor to establish the first data connection using a first handler module associated with the first scheme name, and
to establish the second data connection the memory stores executable instructions for causing the processor to establish the second data connection using a second handler module associated with the second scheme name.

16. The device of claim 15, wherein:
the first scheme name includes a http-app, a https-app, a http-800, or a https-800,
the first handler module includes a http-app module, a https-app module, a http-800 module, or a https-800 module,
the first data connection includes a connection to an application Public Data Network (PDN) or an 800 PDN,
the second scheme name includes a http or a https,
the second handler module includes a http module or a https module, and
the second data connection includes a connection to Internet PDN.

17. The device of claim 13, wherein:
to determine the first APN network identifier the memory stores executable instructions for causing the processor to determine the first APN network identifier based on a first port number included within the first URL, and
to determine the second APN network identifier the memory stores executable instructions for causing the processor to determine the second APN network identifier based on a second port number associated with the second URL.

18. The device of claim 13, wherein:
to determine the first APN network identifier the memory stores executable instructions for causing the processor to determine the first APN network identifier based on a first query string syntax included within the first URL, and
to determine the second APN network identifier the memory stores executable instructions for causing the processor to determine the second APN network identifier based on a second query string syntax associated with the second URL.

19. The device of claim 18, wherein the first query string syntax appears after a domain server name included in the first URL and after a question mark.

20. The device of claim 13, wherein:
to establish the first data connection the memory stores executable instructions for causing the processor to:
send to the network a first data connection request for authentication, and
receive from the network a first IP address in response to the first data connection request, and
to establish the second data connection the memory stores executable instructions for causing the processor to:
send to the network a second data connection request for authentication, and
receive from the network a second IP address in response to the second data connection request.

21. The device of claim 13, wherein the memory further stores executable instructions for causing the processor to:
send over the first data connection data associated with the first URL to the network; and
send over the second data connection data associated with the second URL to the network.

22. The device of claim 13, wherein the memory stores executable instructions for causing the processor to further perform:
prior to establishing the first data connection, modify the URL or uniform resource indicator associated with the first URL by removing or replacing parameters in the respective URL or uniform resource indicator associated with the first URL.

23. The device of claim 13, wherein the memory stores executable instructions for causing the processor to further perform:
parsing by the web browser application a Uniform Resource Indicator (URI) scheme associated with the first URL, and
mapping the URI scheme to the first APN network identifier for establishing the first data connection to the network.

24. A method comprising
receiving, at a web browser application installed on a device, a Uniform Resource Locator (URL);
selecting, by the web browser application, from a plurality of Access Point Names (APNs) an Access Point Name (APN) associated with the URL;
establishing a communication tunnel between an enterprise associated with the URL and the device based on the selected APN; and
communicating with the enterprise through the established communication tunnel,
wherein each of the plurality of APNs is associated with a different communication tunnel between the enterprise and the device, wherein the different communication tunnel of each of the plurality of APNs is respectively associated with an app PDN, an admin PDN, an 800 PDN, or an IP Multimedia System PDN, and each of the different communication tunnels is different from the established communication tunnel.

* * * * *